United States Patent Office 3,437,410
Patented Apr. 8, 1969

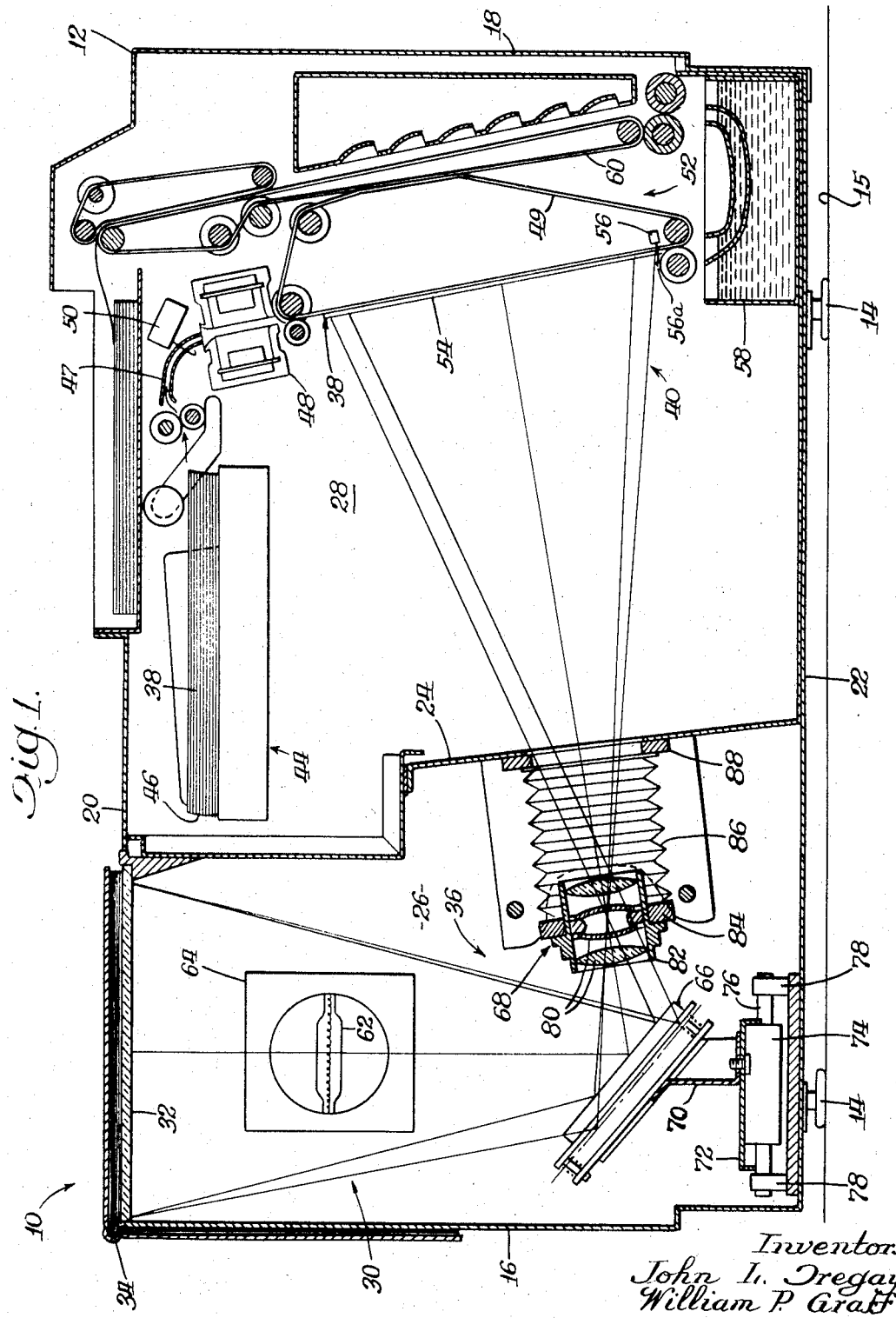

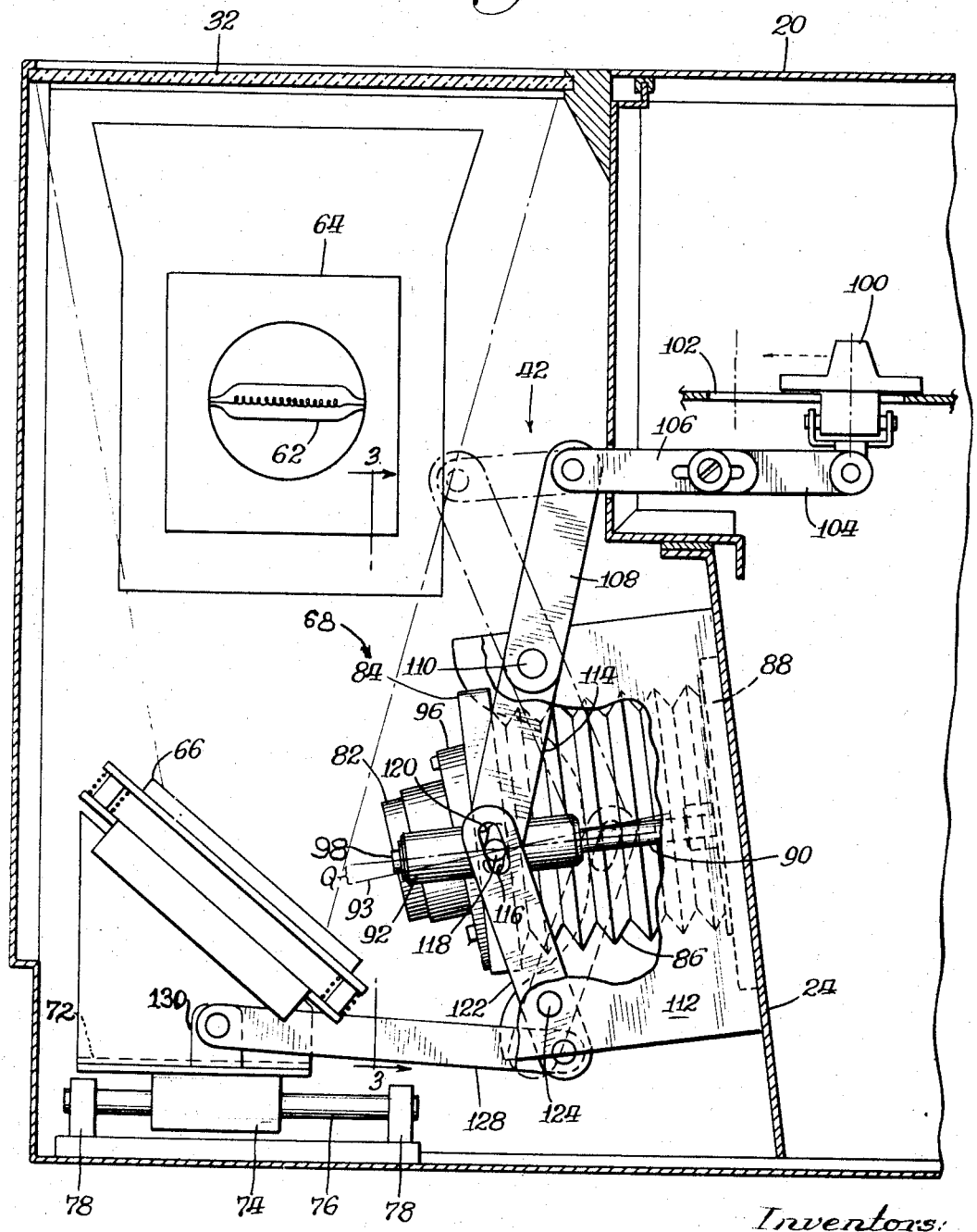

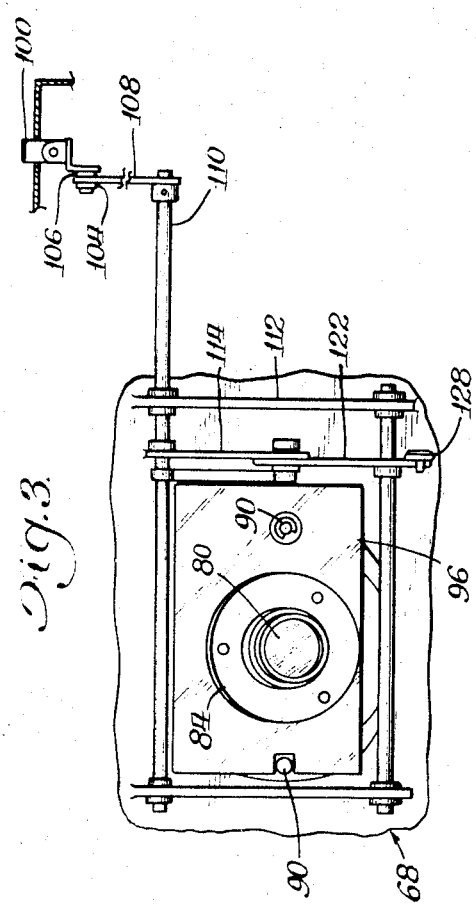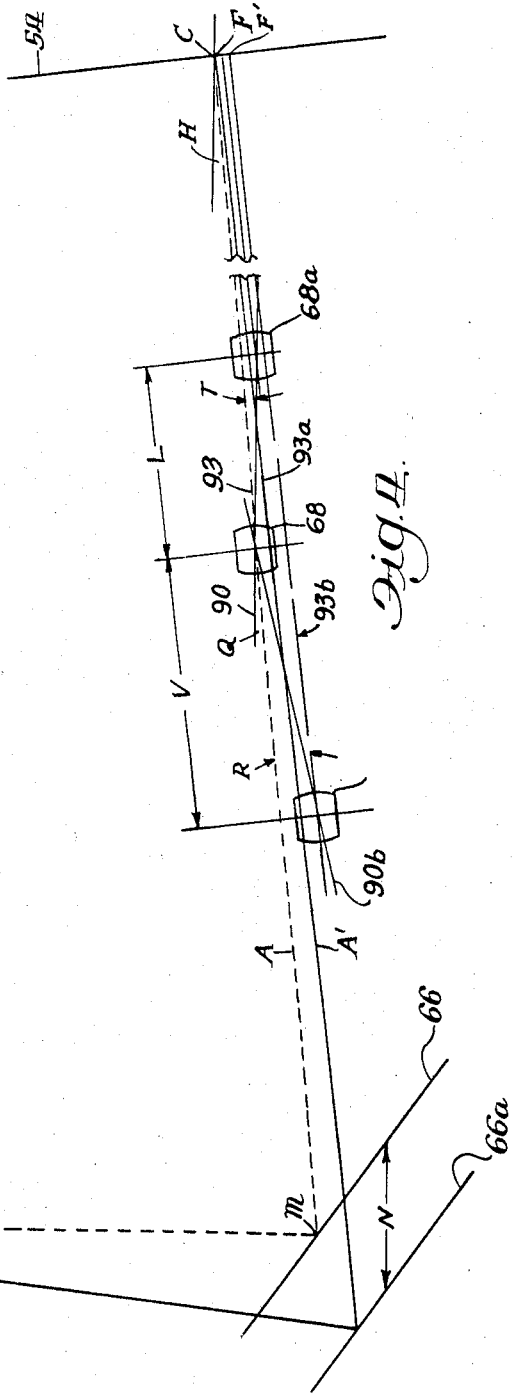

3,437,410
PHOTOCOPYING APPARATUS
John L. Tregay, Wilmette, and William P. Graff, Chicago, Ill., assignors to Addressograph-Multigraph Corporation, Mount Prospect, Ill., a corporation of Delaware
Filed Apr. 26, 1966, Ser. No. 545,344
Int. Cl. G03b 27/36, 27/70
U.S. Cl. 355—57       14 Claims

ABSTRACT OF THE DISCLOSURE

An optical assembly capable of varying the size of a projected image from a fixed illuminating station to a fixed exposure station by simultaneously adjusting the lens and reflective surface. The lens is mounted in a manner so that adjustment for enlargement or reduction moves the lens in a path that is oblique to the optical axis of the lens. The reflective surfaces and the lens are interconnected by linkage mechanisms so that their movement is coordinated through a single operator. Movement of the lens assembly in this manner moves the field of view of the lens, but does not require any adjusting movement of either the original subject or the plane of exposure.

---

This invention relates generally to photocopying machines and, more particularly, relates to improvements in optical apparatus for projecting enlarged or reduced light images of an original subject onto the surface of a photosensitive member.

In the photocopying art general use is made of optical systems in copying machines to photographically record light images of the graphic subject matter to be reproduced. Photographic recordation as used herein refers to the technique of projecting a light image onto light-sensitive copy sheets through a lens system and may include one or more reflective surfaces or mirrors. The organization of a typical photocopying machine calls for an exposure station where the light-sensitive copy sheet is located for suitable exposure, an illuminating station for receiving the graphic subject matter to be reproduced, and an optical system which places the two stations in communication. Such photocopying equipment also includes a developing station where the exposed latent image-bearing copy sheet is developed into a readable image.

By and large, the commercially available photocopying machines are restricted to making an actual size reproduction of the original. The construction of prior art machines capable of making an enlarged or reduced size copy are complex and cumbersome. In order to vary the size of the projected image either the illuminating station or the exposure station is moved from its position in the housing together with the lens system. In this manner the object distance which is defined as the distance from the illuminating station to the lens, and the image distance, which is defined as the distance from the lens to the image, are adjusted to vary the image size. To fit the complex mechanism in a reasonably dimensioned housing reflective surfaces or mirrors are used so that the optical path can be folded within the enclosure. This requires the adjustment of the reflective surface as well. Understandably the control mechanism necessary to adjust portions of the housing are complex and cumbersome for the reason that portions of the housing are moved each time the size of the copy changes.

Giving pause to consider briefly the known techniques for varying the size of the image in the circumstance where the object and image must remain stationary they generally call for adjusting the mirror and the lens. It is well understood that to enlarge or reduce the image the optical path must be increased over what is required for an actual size reproduction. This may be accomplished by moving the mirror so as to increase the light path from the object to the exposure plane. Unless the lens is also adjusted portions of the image will be outside the angle of view of the lens. Tilting the mirror to recenter the image causes distortion of the image generally referred to in the art as "keystoning." Movement of the lens only along the optical axis produces an improperly focused image.

In the convenience copying field there is a need for photocopying equipment capable of making copies that vary in size from the original but which is simple to operate, compact in size and which turns out quality copies with consistent reliability. By the convenience copying field is meant the copying demands found in general business offices, law offices, offices of insurance firms, and the like, for handling legal size documents, small size originals and books onto an 8½ x 11-inch copy sheet. The ability to make copies on demand from general correspondence as a source document is a convenient business tool.

The important requirements of such equipment in order that it be acceptable in the convenience copying field is that it be compact so that it can be located in the office proper, simple to operate without special training and turn out consistently high quality copies. To meet the requirements of compactness and simplicity it is desirable that the illuminating station and the exposure station be in fixed positions relative to the housing so that the outside dimension of the machine remains constant.

It is a general object of this invention to provide an adjustably movable optical apparatus employing a fixed focal length lens capable of varying the size of the light image of an original created at a fixed illuminating station projecting onto a fixed exposure plane a light image which is centered at the exposure plane for all settings.

It is a further object of this invention to provide an improved photocopying apparatus capable of varying the size of the image of an original at a fixed illuminating station and a copy sheet at a fixed exposure station that is compact, simple to operate, and the adjustment of the lens and mirror made with a single control operable from outside the machine.

It is another object of this invention to provide an optical apparatus employing a fixed focal length lens capable of varying the size of the projected image by simultaneously positioning the lens and mirror in relation to a fixed exposure plane and illuminating station with one adjustment.

It is a specific object of this invention to provide an optical apparatus employing a fixed focal length lens and a mirror surface capable of varying the size of the projected image by one adjustment causing simultaneous movement of the lens and mirror surface through a system of linkages and mounting means.

In accordance with the present invention there is provided an optical system for use with photocopying equipment which includes an adjustably mounted lens and a mirror which bends the optical path necessary to produce a right reading image. The lens and mirror are mounted in a manner to permit their simultaneous movement from a reference position or a normal position to a displaced position thereby varying the optical distances between a fixed illuminating station and a fixed exposure station.

The reflective surface or mirror is mounted on a movable platform and maintained at a fixed angular position to the exposure plane. The lens which includes an extension bellows is slidably mounted on a pair of rail means which are disposed at a slight angle to the optical axis of the lens. Movement of the lens along the rail means translates the lens along a line lying in a plane that intersects the exposure plane at an angle slightly less than 90°.

Through a system of connecting linkages and actuating members the mirror and lens means are simultaneously moved to various predetermined positions by a control arm operable from outside the housing.

The reference position for the optical system is intended to define a position of alignment for the lens and mirror with the illuminating station and the exposure plane. In this position there is established a reference image area on the exposure plane which is centered with respect to the field of view of the lens. Stated another way, if the light emanating from the center of the original is represented by a single ray trace, it will coincide with the optical axis of the lens. The axial ray traces will strike the exposure plane at the geometric center of the field of view of the lens along a line that is normal to the plane. It should be pointed out that this arrangement of the optics is conventional since it utilizes the central portion of the lens elements which transmits the light more efficiently than at the edges.

Other objects and advantages of the present invention are either inherent in the structure disclosed or will become apparent to those skilled in the art as the detailed description proceeds in connection with the accompanying drawings wherein:

FIGURE 1 is a cross section elevational view of a photocopying apparatus embodying the optical system of this invention.

FIGURE 2 is an enlarged detail showing the optical apparatus of this invention installed in the photocopying machine.

FIGURE 3 is a front elevational view taken along lines 3—3 of FIGURE 2 of the lens mounting shown in FIGURE 2.

FIGURE 4 is a schematic showing the operation of the optical apparatus of this invention.

Referring now more specifically to FIGURE 1 of the drawings, there is illustrated a copying machine which is indicated generally as 10 and which embodies the optical system of the present invention. The machine 10 includes a housing 12 having threaded or adjustable feet 14 for mounting the machine 10 in a level position on a supporting bench, table or desk 15.

The housing is formed of a pair of parallel transversely spaced vertical side walls 16 and 18 and a pair of transversely extending spaced horizontal walls 20 and 22, forming a light-tight enclosure. Midway in the housing is a dividing wall 24 which separates the housing into a rear and forward compartment 26 and 28, respectively.

An illuminating station indicated generally as 30 is provided in the rear compartment of the rectangular housing 12 adjacent the top wall 20 and includes a plate glass 32 or other light transmitting material which forms a part of the top wall structure 20 and serves as the illuminating plane. The glass pane 32 is so positioned in the top wall 20 that its edge is coextensive with the left-hand vertical wall 16 of the housing 12. This permits the original material to be copied by the machine 10 to comprise not only sheet material but also material from bound volumes, such as the page of a book 34, shown in FIGURE 1. The book 34 can be placed with its back along the edge formed by the glass pane 32 and the vertical wall 18 of the housing 12 with the page to be copied overlying the glass pane 32 and with the remainder of the book extending vertically along the adjacent wall 18 of the housing 12.

The light source included in the illuminating station 30 provides light which is reflected from the original at the station 30 and is transmitted through an optical system indicated generally as 36 (FIGS. 1 and 2) to impinge on an electrophotostatic copy sheet 38 which is held in a stationary position at an exposure station indicated generally as 40. The optical system 36 can be adjusted to a plurality of different settings by a control assembly or system of linkages indicated generally as 42 (FIG. 2) to permit the machine 10 to provide copies on the copy sheet 38 of different sizes, e.g., actual, reduced or enlarged size.

The assembly 42 is manually actuated by the operator at a position outside of the housing 12 and does not require factory adjustment in order to provide copies of different sizes. To provide means for supplying a copy sheet 38 at the exposing station 40, the machine 10 includes a magazine assembly indicated generally as 44 containing a stack 46 of individual copy sheets 38 located in the forward compartment 28.

When the machine 10 is placed in operation, suitable control means in the sheet feeding assembly 44 are actuated to feed a single sheet from the stack 46 over a paper guideway 47 to a charging station indicated generally as 48. As the forward edge of sheet 38 provided by the assembly 44 approaches the charging station 48, a switch 50 is operated to place the charging station in operation so that opposite sides of the copy sheet 38 are provided with a uniform electrostatic charge. A sheet conveying assembly, indicated generally as 52 and which is intermittently operated, advances the charged sheet received from the charging station 48 carried on a continuous belt 49 to a position disposed in a fixed predetermined exposure plane 54 at the station 40. The copy sheet 38 is held in engagement with the conveying means 52 described in greater detail in the copending application, Ser. No. 457,649, of J. V. Bruning et al., assigned to the same assignee, filed May 21, 1965, now U.S. Patent 3,397,627, issued Aug. 20, 1968.

When the sheet 38 is advanced to a proper position in the fixed and predetermined exposure plane 54 by the conveying means 52, the leading edge of the sheet engages an operator 56a on a switch 56 operating this switch and arresting further movement of the conveying means 52. The light source at the illuminating station 30 is momentarily energized to project a light image through the optical system 36 to selectively discharge the surface of the copy sheet 38 at the exposure station 40.

After a suitable time delay, the conveying means 52 is placed in operation so that the exposed copy sheet containing a latent electrostatic image is advanced to a developing station 58 of the liquid type in which electroscopic powder in liquid carrier is placed in contact with the electrically charged surface of the copy sheet 38 to provide a visible image by the selective deposition or attraction of the electroscopic powder. The leading edge of the developed copy sheet is received on the discharge run of belts of the conveying means 52 and is held in engagement therewith by the air discharge from the air impelling assembly described in the aforementioned copending application.

Referring now more specifically to the illuminating station 30, which is disposed in the rear compartment 26, a pair of lamps 62 and cooperating reflectors 64 are provided adjacent the front and rear walls of the housing 12. The lamps 62 and the corresponding reflectors 64 are so disposed as to direct light against the lower surface of the glass plate 32 to provide a reflected light image which is directed by the optical system 36 onto the exposed surface of the copy sheet 38 at the exposure station 40.

The optical system or assembly 36 includes a reflecting surface or mirror means 66 which is mounted in an inclined position below the glass pane 32 so as to direct light reflected from the original to a lens assembly 68 included in the optical system 36. The mirror means 66 is mounted on a supporting structure 70 which is secured at its base to a plate 72. Opposite ends of the plate 72 are secured to a pair of bushings or sleeve members 74 which are slidably mounted on a pair of rods 76 supported on the base of the housing 12 at spaced positions by a pair of standards 78. The sleeves 74 to which the supporting structure for the reflecting means 66 is connected are slidably mounted on the rods 76 to permit the mirror or the reflecting means 66 to be moved toward and away from the lens assembly 68.

The lens assembly 68 includes a plurality of lens elements 80 carried in a lens barrel 82 that is secured to a front wall 84 of an extensible bellows 86. The other end of the bellows 86 is secured to an aperture in the member 88 which is secured to the dividing wall 24 in the housing 12 in alignment with an opening therein which places the rear compartment 26 in optical communication with the forward compartment 28 permitting the projection of a light image created at the illuminating station 30 to be cast upon the exposure plane 54 via the lens assembly 68.

The lens assembly 68, best shown in FIG. 2, is also slidably supported on the housing 12 by means of a pair of spaced shafts or rods 90 (FIG. 3) which are rigidly secured at one end to the member 88. The front wall 84 of the bellows assembly is secured at its opposite edges to a pair of sleeves 92 which are slidably mounted on the rods 90. It should be pointed out that the rods 90 are disposed at a slight angle Q (FIG. 4), to the optical axis 93 of the lens. A plate 96 secured to the sleeve 92 is moved with the sleeve along the rods 90. The rod 90 mounting the sleeve member 92 is provided with "E" ring 98 which acts as a front stop for limiting the movement to the left of the sleeves 92. By moving the sleeves 92 on the rods 90, the bellows 86 is expanded and contracted and the position of the lens barrel 82 relative to the exposure plane 54 and the reflecting means or mirror 66 can be varied.

The linkage or control assembly 42 provides means for changing the size of light image impinging upon the copy sheet 38 at the exposure station 40 by adjusting the relative positions of the miror 66 and the lens assembly 68.

The control assembly 42 includes a manual operating arm or knob 100 slidably mounted in and extending through a slot 102 (FIG. 2) which extends in front of and outside the housing 12. The lower end of the knob structure 100 is connected to a pair of connecting links 104 and 106, the other end of the link 106 is pivotally connected to the upper end of an arm 108 whose lower end is rigidly secured to one end of a shaft 110 (FIG. 3). The shaft 110 is pivotally mounted in an intermediate wall 112 of the housing 12. The other end of the shaft 110 is rigidly secured to the upper end of an arm 114, and the lower end of the arm 114 is provided with an elongated slot 116 in which is received a pin 118 secured to the adjacent sleeve 92. In this manner, the knob 100 is coupled to the sleeves 92 connected to the lens barrel 82.

The pin or shaft 118 is also received within an elongated slot 120 and the upper end of a lever 122. An intermediate portion of the lever 122 is pivotally mounted on a shaft 124 carried in the intermediate wall 112 of housing 12. The lower end of the lever 122 is pivotally connected to one end of a link 128, the other end of which is pivotally connected to an upstanding arm or plate 130 which is secured to the base plate 72. Thus, the knob 100 is also coupled to the support for the reflecting means or mirror 66.

When the control assembly is in the position shown in FIG. 1, the optical system 36 provides a one to one size ratio between the original to be copied and the image projected onto the copy sheet 38 in the exposure plane 54 of the exposure station 40. In this setting the control linkage 42 occupies the position shown in solid line in FIG. 2. This is the reference position. When it is desired to produce a reduced size copy in which the ratio of the area of the copy sheet to the image area of the original is, for instance, 11:14, the knob 100 is moved to the left (FIG. 2) to pivot the arm 108 in a counter-clockwise direction to the position shown in dashed line. This rotates the shaft 110 in a counterclockwise direction and swings the arm 114 to the right. As the arm 114 moves to the right, the sleeves 92 are moved to the right on the rods 90 to the position shown in dashed outline, and the lens elements 80 in the lens barrel 82 are moved to the right or closer to the exposure plane.

When the sleeves 92 and the pin 118 are moved to the right by the arm 114, the lever 122 is pivoted in a clockwise direction (FIG. 2) about the shaft 124 so that the link 128 moves the supporting structure 70 for the mirror to the left. This increases the distance from the mirror to the lens elements 80 in the lens barrel 82. With the lens elements 80 now positioned more closely adjacent the plane of exposure at the station 40 and with the reflecting means 66 shifted in a direction parallel to the light transmitting pane 32 away from the lens assembly 68, the image applied to the copy sheet 38 at the exposure station 40 is reduced in size relative to the original graphic material at the illuminating station 30. Accordingly, by manually adjusting the knob 100 at a position outside of the housing 12, the copying machine 10 can be fully adjusted to provide copies of various sizes relative to the original.

The manner in which the novel optical apparatus of this invention produces varying size reproductions of an original located at a fixed illuminating station onto a fixed exposure station without distortion or dislocation of the image with respect to the copy sheet, may best be understood by referring to the optical diagram shown in FIG. 4. The lens 68 and the reflecting means 66 are shown in a reference position with respect to the exposure plane 54 and the illuminating plane 32. The various line extensions to the plane 54 are shown as broken in order to conveniently present the diagram. This reference position will cast a light image that is the same size as the original. The original in position at the illuminating plane 32 will emit a ray trace A which is normal to the plane and which strikes the mirror 66 at a point M and is then reflected into the lens 68 and projected onto the exposure plane 54 at a point C. In this reference position the optical axis 93 of the lens coincides with the axial ray trace A so that the field of view of the lens is centered on the area of exposure which in this case corresponds to the area of the copy sheet.

As is well established in optics, the size of the image projected with a lens of a given focal length is governed by the distance measured along the ray trace A between the illuminating plane 32 and the lens 66 known as the object distance. The distance from the lens to the exposure plane 54 is known as the image distance. The object distance and the image distance in this reference position are equal and their sum is equivalent to a value four times the focal length of the lens. Accordingly, in this reference position the ratio of the image size to the object is one to one.

In the reference position the optical axis is along the line 93 normal to the exposure plane 54 and the lens barrel is mounted on the rail mounting means 90 which are disposed at an angle Q to the optical axis. Excursion of the lens along the rail will translate the lens in a forward direction and downward. The optical axis during this excursion is always maintained normal to the plane but at position 68a is laterally shifted to coincide with a line 93a which is parallel to 93.

In order to effect an image reduction the lens would ordinarily be moved closer to the exposure plane 54 to position 68a and the mirror moved to position 66a, thus increasing the object distance in proportion to the image distance to give the necessary size reduction. It should be pointed out that both the exposure plane 54 and the illuminating station 30 as well as the subject placed at the illuminating station all remain stationary. The angular position of the mirror 66a is constant, that is, its movement is such that it is in a plane parallel to its former position at 66.

The lens assembly 68 has been translated in a direction along the ray trace A a distance L along the optical axis 93 and also moved laterally with respect to this line 93 a distance T. The mirror has simultaneously moved a distance N.

With the optical system adjusted to this new arrangement the mirror will intercept a ray trace A' which is no longer an axial ray, that is, it is no longer normal to the illuminating plane 32 but assumes a slight angular relationship striking the mirror 66a, and is then projected onto the exposure plane to the same position C. It should be pointed out, however, that the optical axis 93a of the lens has now shifted so that it no longer coincides with the ray trace A and intersects the plane of exposure 54 at the point F. The effect of moving the lens in this manner is that it moves the field of view of the lens so that it now no longer coincides exactly with the field of view in the reference position.

It is conventional in the field of optics to have the central ray traces coincide with the optical axis of the lens. In this way the most efficient portion of the lens, namely, the central portion, is utilized so that the image is of uniform light intensity from the center out to the edges of the copy or image. In the instant invention the shift of the optical axis produces no noticeable change in the uniformity of the illumination. Stated otherwise, in using a light-sensitive electrophotographic member the quality of the projected image is fully comparable to the quality obtained when the optical system is in the reference position.

Further, the movement of the mirror to position 66a, as has been pointed out earlier, has the effect of intercepting ray trace A' at a slight angle to the illuminating station 30. The relationship of the mirror to the illuminating station and the shifting of the lens might be expected to optically tilt the illuminating plane 32 with respect to the reference position in order that the ray trace A' would appear to be normal to the illuminating station and hence distort the image. In practice the effect of directing the ray trace A' to the point C on the exposure plane does not give the effect of tilting the illuminating station and there is no observed image distortion such as "keystoning."

Enlargement of a subject smaller than the copy sheet area is accomplished in a similar manner. The lens is moved to position 68b a distance V from the reference position and then shifted laterally a distance R. The mirror may remain in position 66a in the circumstance where the amount of enlargement of the orginal is the reciprocal value of the reduction. The ray trace A' emanates from the illuminating station 30 at the same angle as for reduction and is intercepted by the mirror 66a, projected into the lens 68b and cast upon the exposure plane 54. The angle of view of the lens 68b will be slightly off from the reference field of view but the ray trace A' will intersect the reference area at a point C which coincides with the point where ray trace A intersected the plane 54. The optical axis 93b of the lens intercepts the exposure plane 54 at the point F' forming an angle H with a line 32' that is parallel to the illuminating plane 32. The quality of the reproduction is fully the equivalent of that obtained when the rays are axial with the optical axis of the lens.

The following discussion is presented to mathematically set forth the relationships governing the lens and mirror positions for the photocopying apparatus of this invention necessary to give accceptable quality of reproduction. Starting with the reference position the relationship of the lens and mirror may be readily determined from conventional optics. Given the focal length of the lens, the object distance and the image distance are routinely determined and these relationships need not be discussed here. The position of the mirror for a required change in magnification is determined from the following expression:

$$\frac{\text{distance mirror moves}}{\text{focal length}} = \frac{(\text{magnification}-1)^2}{\text{magnification}} \times \frac{\text{secant of the angle formed by optical axis and illuminating station}}{}$$

The lens experiences translations in two directions, first, to vary the object to image ratio, and second, to laterally shift the optical axis and, hence, the field of view. It should be pointed out that while the position of the lens is described in terms of movement in two separate directions, this is merely for the purpose of illustration and the axial path taken by the lens from the reference position to the position in which the image is varied in size may be along a line which is the shortest distance between these two points. Referring to FIG. 4 the first movement of the lens is along the line of reference 93 and the second is a lateral displacement of the lens from the line 93 a distance T. These distances may be determined as follows:

$$\frac{\text{axial lens displacement}}{} = \text{focal length (magnification}-1)$$

$$\frac{\text{lateral lens displacement}}{} =$$

$$\frac{\text{focal length}}{} \frac{(\text{magnification}-1)^2}{\text{magnification}+1} \text{ tangent} \left(\frac{90° - \text{angle } H}{2}\right)$$

Positive values for the distances expressed in the above equations will indicate movement of the lens in a direction which decreases the object distance from the reference position. Negative values indicate a movement which will increase the object distance. In the circumstance where the lens employed in the photocopying apparatus has a field angle of 26° and a focal length of 8.25 inches, a 30% maximum reduction can be achieved before the image quality becomes unacceptable. The same lens will afford a maximum enlargement of 30% before there is a fall-off in image quality.

The instant invention has been described in the environment of a particular type of photocopying apparatus, one which employs the well-known photoelectrostatic reproduction techniques. It will be appreciated that advantages of the instant invention are independent of a particular copying process or copying materials and can be realized in any imaging apparatus requiring the projection of varying size images.

What is claimed is:

1. An optical apparatus for projecting different size light images of an illuminated subject disposed at a fixed illuminating station onto a fixed exposure plane comprising:

lens means and mirror means movably mounted between said illuminating station and said exposure plane defining an optical path therebetween, said lens means having an optical axis extending along a line normal to said exposure plane, means mounting said lens means and mirror means each for relative movement in a predetermined relation with respect to each other between a first position and a second position, path means located along a line extending obliquely to said optical axis for translating the lens between said positions while maintaining the lens axis normal to said plane, means for actuating said lens means and mirror means, said image projected with the lens and mirror in said first position defining a reference image area on said plane and in said second position said lens axis is normal to said plane and laterally displaced from its first position whereby the resulting image is centered with respect to the reference area.

2. The optical apparatus as claimed in claim 1 wherein said actuating means moves said lens in a reciprocating motion along said path means between the first and second positions.

3. The optical apparatus as claimed in claim 1 wherein linkage means connect said lens mounting means and mirror mounting means effecting simultaneous movement thereof.

4. The optical apparatus as claimed in claim 1 which includes support means for supporting the mirror in a constant angular relation to the exposure plane.

5. In an optical apparatus for projecting onto a fixed exposure area different size light images for an illuminated subject disposed at a fixed illuminating station, the combination comprising:
   movably mounted reflective surface means and a movably mounted lens means disposed intermediate the exposure area and illuminating station each being in first position projecting an image of first magnitude of the subject onto said exposure area, said lens having an optical axis which axis with the lens in the first position comprises a line of reference extending normal said exposure area and intersecting said area at the center thereof,
   means for moving said surface from said first position to a second position, the surface in said second position being parallel to the surface in said first position,
   means for moving said lens from said first position to a second position along a line extending obliquely to said reference line in which the lens axis in said second position is normal to the exposure area and parallel to the line of reference,
   said surface and lens means in said second positions cooperating to project an image of second magnitude of the subject whereby the center of said second image coincides with the center of the exposure area.

6. The combination as claimed in claim 5 wherein said line of reference is normal the illuminating station and intersects the center thereof, and with the lens in said second position said axis is normal the illuminating station and runs parallel to said line of reference.

7. The optical apparatus as defined in claim 5 wherein said moving means includes link means interconnecting said lens and reflective surface for effecting simultaneous movement thereof.

8. The combination as defined in claim 5 wherein said lens mounting means includes guide means for guiding the lens along said path.

9. In an optical apparatus for projecting a different size light image of an illuminated original subject disposed at a fixed illuminating station onto a fixed exposure plane, comprising:
   lens means movably mounted between said illuminating station and said exposure plane with the optical axis of said lens being normal to the exposure plane,
   mirror means movably disposed between said illuminating station and said lens for reflecting the light image into said lens,
   movably platform means for receiving the mirror thereon including support means for maintaining the angular relationship of the mirror constant with respect to the plane of exposure,
   rail means for slidably receiving the lens means thereon, said rail means being disposed at an incline with respect to said lens axis, for translating said lens along a line extending obliquely to said optical axis of the lens,
   linkage means connecting said platform with said lens means,
   means for actuating the lens along said rails, between a first and second position whereby said mirror means is simultaneously moved to a corresponding position of adjustment to vary the size of the projected image and the optical axis of the lens is maintained normal to the exposure plane whereby the projected images on said exposure plane are respectively centered with respect to one another.

10. An optical apparatus for projecting different size light image of an illuminated original subject disposed at a fixed illuminating station onto a fixed exposure plane comprising:
    lens means and mirror means movably mounted between a normal position and a displaced position said lens means in the normal position having an optical axis extending along a line normal to and at the center of said exposure plane defining a reference image area,
    support means for supporting said mirror means at a fixed angular relation to the exposure plane,
    platform means for slidably mounting said mirror means,
    path means for translating the lens from the normal to said displaced position along a path oblique to the optical axis of said lens means,
    means for reciprocally actuating said lens means and said mirror means between said positions, and
    lens mounting means for maintaining the optical axis normal to said exposure plane during movement whereby the image projected with the lens and mirror means in the displaced position is centered with respect to the reference image area.

11. The optical apparatus as claimed in claim 10 wherein said actuating means includes manual lever means operable from outside the apparatus.

12. The optical apparatus as claimed in claim 10 wherein said path means includes rail means adapted to slidably receive the lens whereby the distance of the lens from the exposure plane may be varied.

13. In a photocopy machine of the type described the combination comprising:
    a fixed illuminating station for receiving an original subject to be copied,
    a fixed exposure plane for receiving projected light images,
    means for feeding single sheets of light-sensitive copying material,
    means for conveying said light-sensitive copy sheets to a predetermined position for exposure on said exposure plane,
    lens means and mirror means movably mounted between a normal position and a displaced position, said normal position defining a projected reference image area in which the lens axis extends along a line normal to and at the center of said exposure plane,
    means mounting said lens means and mirror means each for relative movement with respect to each other,
    path means for reciprocally translating the lens between the normal and displaced positions in an oblique direction to said lens axis while maintaining the lens axis normal to said plane,
    whereby the image projected onto the copy paper with the lens in the displaced position is centered with respect to and of a different size than the reference image area projected with the lens in the normal position.

14. The photocopying machine as claimed in claim 13 including means for manually actuating said lens means and said mirror means simultaneously to their respective positions, said means being operable from a station outside the machine.

References Cited

UNITED STATES PATENTS

| | | | |
|---|---|---|---|
| 2,431,612 | 11/1947 | Furnas | 88—24 |
| 2,940,358 | 6/1960 | Rosenthal | 88—24 |

NORTON ANSHER, *Primary Examiner.*

W. A. SIVERTSON, *Assistant Examiner.*

U.S. Cl. X.R.

355—66